United States Patent [19]

Ochiai

[11] Patent Number: 4,993,466
[45] Date of Patent: Feb. 19, 1991

[54] RADIAL TIRE FOR HEAVY DUTY VEHICLES HAVING A GROOVED BUFFER PLANE OUTWARD OF EACH TREAD EDGE

[75] Inventor: Kiyoshi Ochiai, Kobe, Japan

[73] Assignee: Sumitomo Rubber Industries, Ltd., Hyogo, Japan

[21] Appl. No.: 279,708

[22] Filed: Dec. 5, 1988

[30] Foreign Application Priority Data

Dec. 9, 1987 [JP] Japan ................... 62-312682

[51] Int. Cl.⁵ ............................................. B60C 11/01
[52] U.S. Cl. .................................. 152/209 R; 152/523
[58] Field of Search ............... 152/209 R, 209 D, 454, 152/523

[56] References Cited
U.S. PATENT DOCUMENTS 3,097,681 7/1963 Harkins ........................... 152/209 R
3,176,748 4/1965 Giebhart ......................... 152/209 R

FOREIGN PATENT DOCUMENTS 1480933 4/1969 Fed. Rep. of Germany.
25535 2/1951 Switzerland ................... 152/209 R
819553 9/1959 United Kingdom ........... 152/209 R Primary Examiner—Caleb Weston
Assistant Examiner—Geoffrey L. Knable
Attorney, Agent, or Firm—Birch, Stewart, Kolasch & Birch

[57] ABSTRACT

The invention relates to a radial tire for heavy duty vehicles in which the wandering phenomenon can be effectively prevented. The tire has a tread surface defining a ground contacting area between the axially outer edges thereof and provided with at least one longitudinal groove extending in the circumferential direction of the tire; and a buffer plane extending radially inwardly from each of the axially outer edges of the tread surface so as to be formed substantially in part of a right circular cone having its axis placed on the tire axis, the buffer plane being provided with at least one buffer groove extending substantially continuously in the circumferential direction of the tire.

3 Claims, 4 Drawing Sheets

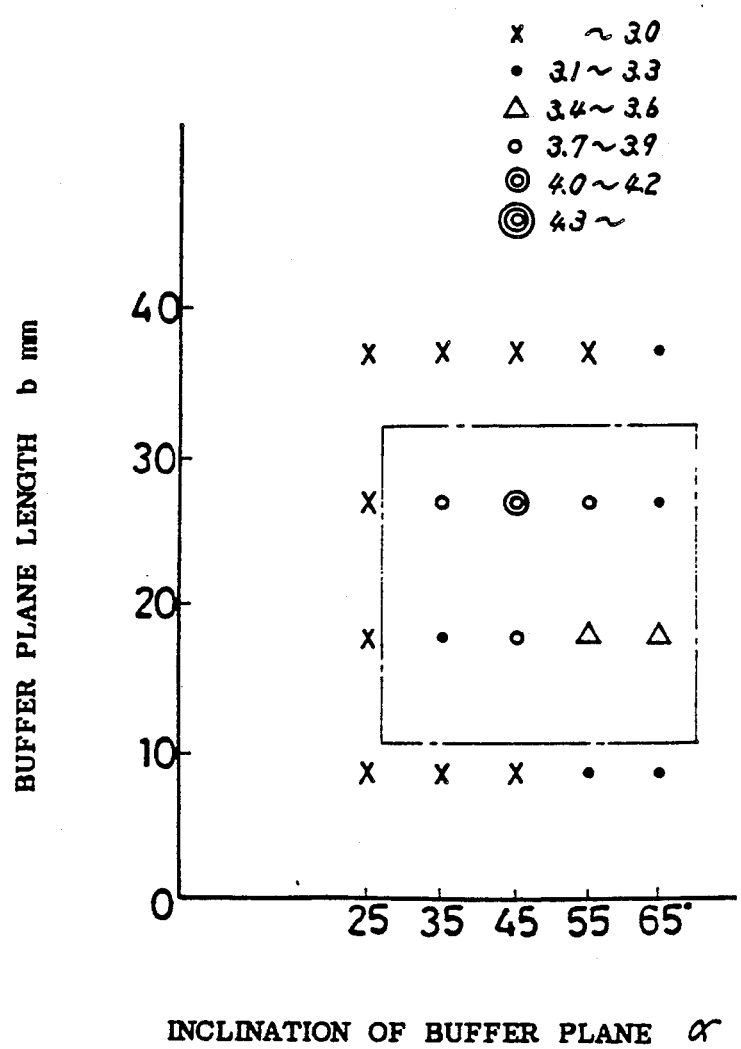

RADIAL TIRE FOR HEAVY DUTY VEHICLES HAVING A GROOVED BUFFER PLANE OUTWARD OF EACH TREAD EDGE

BACKGROUND AND SUMMARY OF THE INVENTION

The present invention relates to a radial tire for heavy duty vehicles in which the wandering phenomenon can be effectively prevented.

While the vehicle on which the so-called heavy duty radial tires are mounted, such as truck, bus, light truck and the likes, is running on the road having various gradients on the surface in the lateral direction to the running direction of the vehicle, such as a rutted road, the wandering phenomenon is often experienced by the driver, especially when running at high spaced.

In general, radial tires are provided with a steel cord belt over the carcass to provide a hoop effect on the tire and to increase the rigidity of the tread region. Such belt reinforcement, however, increases the rigidity of both edge portions of the tread which has a great effect on the wandering phenomenon. Further, in the conventional radial tires, the outer periphery of the tread region, that is, the tread surface is formed in a smoothly curved profile all over the width. Accordingly, as exaggeratedly shown in FIG. 6, the tread surface A has non-contacting parts D in the vicinity of the tread edges. Such parts gradually extend away from the road surface C towards the axially outside due to the above-mentioned curvature, but its start point (B) is continually shifted irregularly while running on the road having various gradients on the road, surface, which creates irregular lateral forces on the tire, and the force act on the rigid tread edge portions. As the result, the wandering phenomenon of the vehicle is induced. On the basis of such understanding and discovery, the present invention was made.

It is therefore, an object of the present invention to provide a heavy duty radial tire whereby the wandering phenomenon can be effectively prevented.

According to one aspect of the present invention, a heavy duty radial tire is provided with a tread surface defining a ground contacting area between the axially outer edges thereof and provided with at least one longitudinal groove extending in the circumferential direction of the tire, and a buffer plane extended radially inwardly from each of the axially outer edges of the tread surface so as to be formed substantially in part of a right circular cone having its axis placed on the tire axis, the buffer plane being provided with at least one buffer groove extending substantially continuously in the circumferential direction of the tire.

BRIEF DESCRIPTION OF THE DRAWINGS

An embodiment of the present invention will now be described in detail by way of example only with reference to the drawings, in which:

FIG. 4 is a diagram showing the relationship between tire performance and the length and inclination of buffer plane;

DETAILED DESCRIPTION OF THE INVENTION

Figure 1:
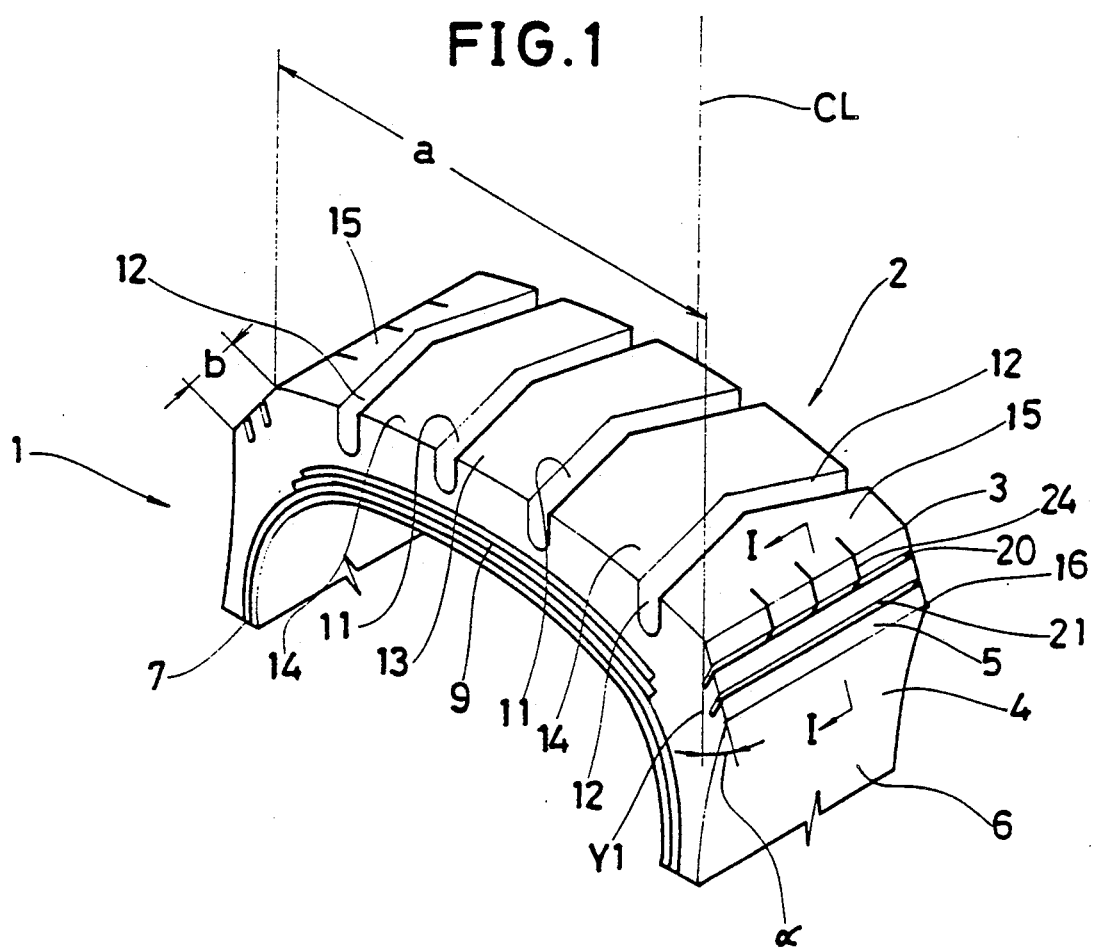
FIG. 1 is a perspective view showing an embodiment of the present invention.
Figure 2:
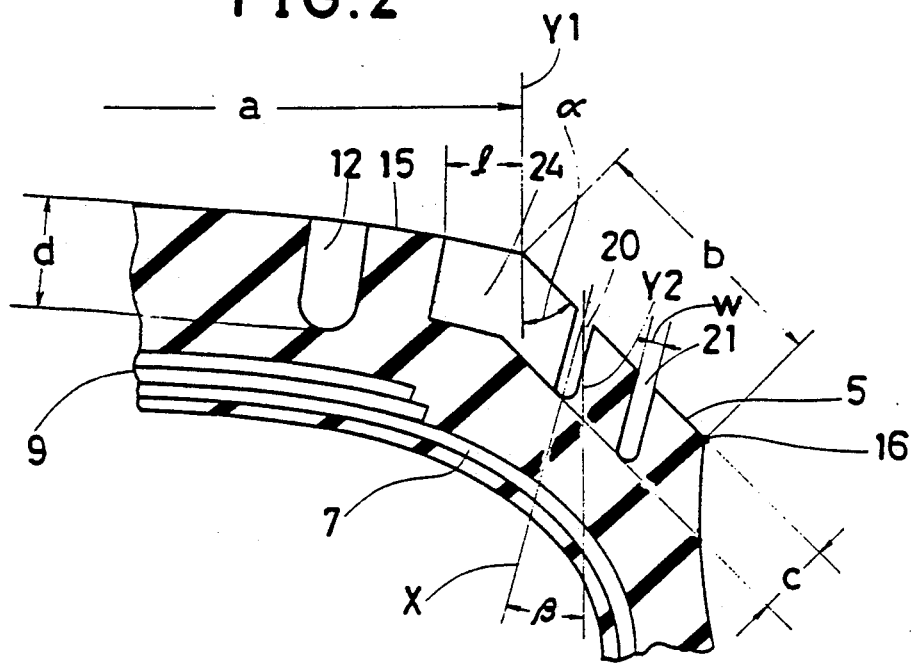
FIG. 2 is a sectional view taken along a line I-I thereof.

In FIGS. 1 and 2, the tire 1 for heavy duty vehicles comprises a pair of bead cores one disposed in each bead region, a carcass 7 extended between the bead regions and having a radial cord ply secured in both edge portions to the bead cores, a rubber tread disposed radially outside the carcass, a pair of rubber sidewalls disposed on the outside of the carcass, a belt 9 composed of steel cords and disposed between the carcass and the tread.

The tire is provided with buffer planes 5 between the axially outer edges 3 of the ground contacting area in the tread region 2 and the radially outer edges 16 of the buttressed part in the sidewall region 4. Here, the buttressed part is a radially outward part in the sidewall region.

The tire is provided in the tread region 2 with four longitudinal grooves 11, 11, 12 and 12 extended zigzag in the circumferential direction of the tire to form a rib type tread pattern which is made up of five ribs, one center rib 13 between the inner two longitudinal grooves 11, two middle ribs 14 between the inner longitudinal groove 11 and the outer longitudinal groove 12, and two outer ribs 15 between the outer longitudinal groove 12 and the edge 3 of the ground contacting area.

Incidentally, the edges of the ground contacting area of the conventional radial tire lies between the tread edge and a position 5% distance of the tire section width axially inward thereof when the tire is mounted on a specified rim and inflated at a design pressure at a rated load. The buffer plane can be formed by cutting off the tread edge portions of such tire outward of the edges of the ground contacting area.

The buffer plane 5 is formed in part of a right circular cone having the axis placed on the tire axis. Accordingly, in a section including the tire axis, the buffer plane 5 presents a straight line, although a mildly curved line such as a concave or a convex line which is regarded as being substantially straight can be also employed.

In a section including the tire axis, the length b along the buffer plane 5 is more than 0.05 times and less than 0.18 times, more preferably less than 0.15 times the axial distance between the edges 3 of the ground contacting area.

The inclination (alfa) of the buffer plane 5 is less than 70 degrees, and more preferably less than 55 degrees and more than 25 degrees, where the inclination is defined, in a tire section including the tire axis, as an angle between a straight line (5) drawn between the above-mentioned edges 3 and 16 and a straight line Y1 drawn radially inwardly from the edge 3 in parallel with the tire equator.

Furthermore, the buffer plane 5 is grooved in the circumferential direction of the tire to form at least one buffer groove. In this embodiment two grooves 20, 21 are shown.

The width W of the buffer grooves is about 0.5 to 7 mm. The depth C of the buffer grooves is more than 0.25 times and less than 0.8 times, and more preferably more than 0.3 times the depth d of the above-mentioned longitudinal grooves, where the depth is defined as a distance of the groove base from the buffer plane 5, that is, a length measured at right angle to the buffer plane 5 from the groove base to the buffer plane 5. Further, in a section including the tire axis, the inclination (beta) of each buffer groove is more than −15 degrees and less than 45 degrees, and more preferably more than −10 degrees, where the inclination is defined as an angle between the center line X of the buffer groove and a straight line drawn radially inwardly from the point of intersection of the line X and the plane 5 in parallel with the tire equator. The limitation indicates an axially inward inclination as shown in FIG. 2 and accordingly, the positive indicates an axially outward inclination.

Further, the above-mentioned buffer plane 5 is provided with sipes 24.

The sipes are extended axially inwardly from the buffer groove adjacent to the edge 3, in this example the groove 20, beyond the edge 3 into the ground contacting area, and the length of the sipe is set so that the distance of the axially inner end thereof from the edge 3 becomes about 3 to 15 mm.

The sipes are arranged circumferentially of the tire at intervals of 5 to 20 mm, that is, the circumferential pitch of the sipes is set to be about 5 to 20 mm to decrease the rigidity of the portion around the edge 3 while preventing that portion from being torn off and being cracked.

As to the above-mentioned length b and the inclination (alfa) of the buffer plane 5 and the inclination (beta) and depth c of the buffer grooves, the above-mentioned limitations have been determined from the results of many experiments.

Many kinds of 10.00R20 tires were manufactured by combining five kinds of inclination (alfa) of the buffer plane (25, 35, 45, 55 and 65 degrees) with four different lengths b (9, 18, 27 and 37 mm). The tires were identical except for the inclination (alfa) and length b of the buffer plane.

The tread of each tire was provided with five ribs as shown in FIG. 1. The axial distance (a) between the edges 3 of the ground contacting area was set to be 180 mm, and accordingly, 9 mm and 27 mm length in the buffer plane correspond to 0.05 and 0.15 times the above-mentioned length (a), respectively. The depth d of the longitudinal grooves were 13.3 mm.

The width W and the depth c of the buffer grooves were 4.0 mm and 8.0 mm, respectively. The inclination (beta) of the center line X of the buffer groove was 10 degrees.

The circumferential pitch of the sipes was about 15 mm. The length 1 was 10 mm, and the depth of the sipe was the same as that of the buffer grooves.

The tires of each kind were mounted on all of the wheels of an 11-ton truck, and the truck was so loaded that the load of each tire became a normal one (2425 kg). The truck was then run on such a road that the wandering phenomenon was apt to occur at 80 km/h. The tire of each kind was evaluated with respect to its wandering phenomenon by the impressions of three drivers' on the basis of the assumption that the evaluation for a conventional tire is 3.0. The three drivers' evaluations are averaged, and are given in Table 1, wherein the larger the number, the better is the result. Further, the results set out in Table 1 are plotted in FIG. 4, wherein the evaluation is classified into six categories as shown in FIG. 4.

Table 1 and FIG. 4 apparently show that the tires in a specific area surrounded by a chain line are superior to the conventional tire. Such area ranges from 25 to 70 degrees (more preferably 25 to 55 degrees) in the inclination (alfa) and, in the length b, from 0.05 to 0.18 times (more preferably 0.05 to 0.15 times) the length a.

It is supposed that if the length b of the buffer plane 5 is less than 0.05 times, its effect could not be disposed, and if it is more than 0.18 times, the rigidity of the edge part 3 would become increased. Further, if the inclination angle is less than 25 degrees, the rigidity of the above-mentioned edge part becomes excessively low, and if it is more than 70 degrees, there is a possibility that the buffer plane 5 contact with ground.

Furthermore, similarly to the above-mentioned feeling tests, test tires were manufactured by changing the depth c and the inclination (beta) of the buffer grooves 20, 21, and evaluated. The results are given in Table 2 and plotted in FIG. 5.

In each tire, the length b of the buffer plane 5 was 18 mm, that is, 0.1 times the length (a), the inclination (alfa) thereof was 55 degrees, and the depth d of the longitudinal grooves was 13.3 mm.

Accordingly, 2.0 mm, 4.0 mm and 13.3 mm depth in the buffer groove correspond to 0.15 times, 0.3 times and 1.0 times the depth d of the longitudinal groove.

Figure 5:
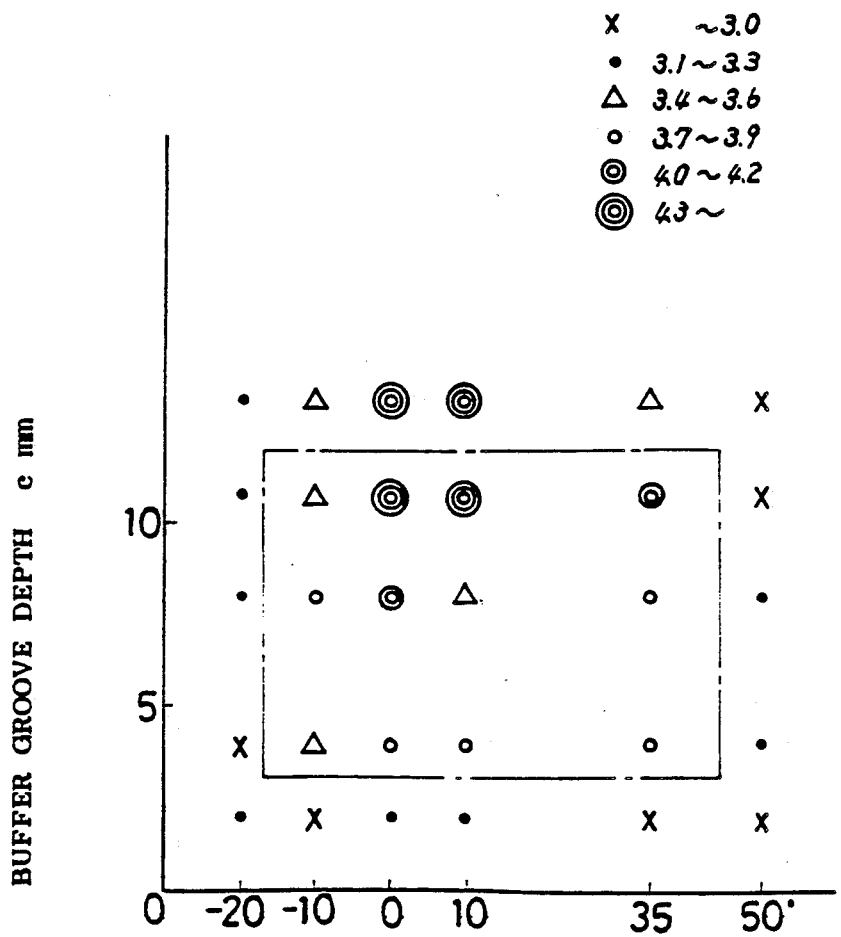
FIG. 5 is a diagram showing the relationship between tire performance and the depth and inclination of buffer groove.

As apparent from Table 2 and FIG. 5, the tires superior to the conventional tire are in a specific area as indicated by a chain line in FIG. 5. Such area ranges from −15 to 45 degrees (more preferably −10 to 45 degrees) in the inclination angle, and, in the groove depth c, ranges from 0.25 to 0.8 times (more preferably 0.3 to 0.8 times) the depth d of the longitudinal groove.

When the groove depth c is less than 0.25 times the depth d, the rigidity of the edge part can not be lowered, and when the groove depth c is 1.0 times the depth d, the occurrence of cracks in the groove base of the buffer groove was observed in the running tests. Accordingly, as described above, the depth of buffer groove 20, 21 is limited to less than 0.8 times the depth d of the longitudinal groove. It is though that the inclination angle (beta) has a significant effect on the rigidity of the edge part.

From the results as explained above, the length b and the inclination angle (alfa) of the buffer plane 5, and the depth c and the inclination angle (beta) of the buffer grooves 20, 21 were limited in the above-mentioned ranges.

Further, three kinds of 10.00R20 tires were manufactured. The tires included one provided with one buffer groove extending at the center of the buffer plane 5, one provided with two parallel buffer grooves, and one provided with three parallel buffer grooves, wherein each groove has the same width of 4 mm. In each kind of tire, the length a between the edges 3 of the ground contacting area was 180 mm, the length b of the buffer plane 5 was 18 mm, the groove depth c of the buffer groove was 8.0 mm, and the inclination angle (beta) thereof was 0 degree.

The tires of each kind were mounted on the front wheels of a 11-ton truck, and the truck run on such a road that the wandering phenomenon is apt to occur at 80 km/h.

Upon the basis of the assumption that the evaluation for the conventional tire is 3.0, each tire was evaluated by the impressions of three drivers and the evaluations by three drivers were averaged, with the results that the averaged evaluations for the tire provided in each buffer plane with one buffer groove, with two grooves and with three grooves are 4.0, 4.2 and 3.9, respectively. From such results, it is apparent that the tire provided in each buffer plane with two buffer grooves, which showed the best score, is superior to the conventional tire from the point of view of the wandering phenomenon.

TABLE 1

|   |      | $\alpha$ |     |     |     |     |
|---|------|------|-----|-----|-----|-----|
|   |      | 25°  | 35° | 45° | 55° | 65° |
|   | 9.0  | 2.8  | 3.0 | 3.0 | 3.1 | 3.1 |
| b | 18.0 | 2.6  | 3.2 | 3.8 | 3.6 | 3.3 |
| mm| 27.0 | 2.4  | 3.7 | 4.0 | 3.8 | 3.1 |
|   | 37.0 | 2.3  | 2.8 | 2.6 | 2.4 | 3.2 | c = 8 mm
β = 10°

TABLE 2

|    |      | $\beta$ |     |    |     |     |     |
|----|------|------|------|-----|-----|-----|-----|
|    |      | −20° | −10° | 0°  | 10° | 35° | 50° |
|    | 2.0  | 3.2  | 3.0  | 3.1 | 3.2 | 2.8 | 3.0 |
| c  | 4.0  | 3.0  | 3.6  | 3.7 | 3.8 | 3.7 | 3.3 |
|    | 8.0  | 3.1  | 3.8  | 4.1 | 3.6 | 3.7 | 3.1 |
| mm | 10.5 | 3.1  | 3.4  | 4.3 | 4.4 | 4.1 | 2.9 |
|    | 13.3 | 3.2  | 3.4  | 4.3 | 4.3 | 3.6 | 2.8 | b = 18.0 mm
α = 55°

Figure 3:
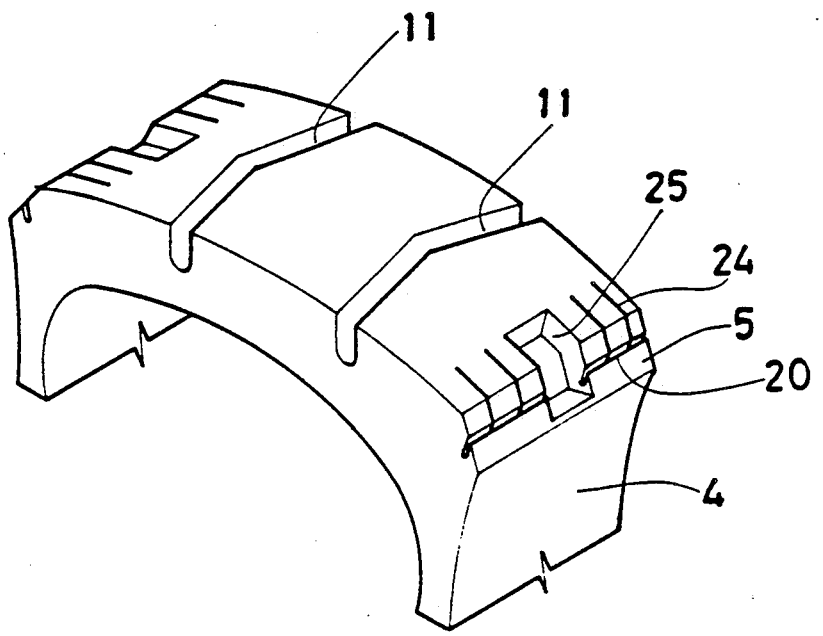
FIG. 3 is a perspective view showing another embodiment of the present invention.
Figure 6:
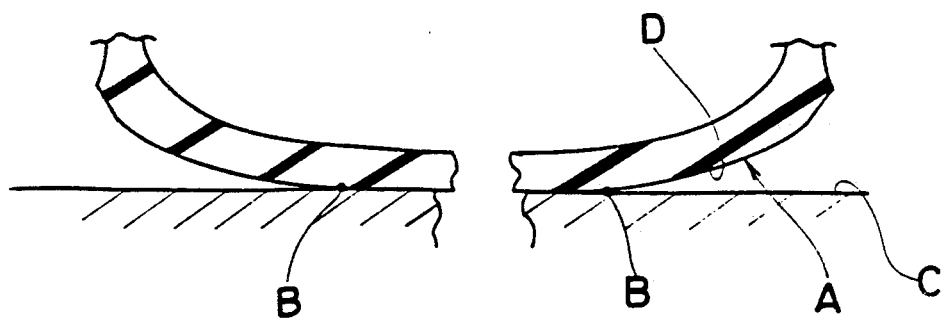
FIG. 6 is a schematic cross sectional view of a tire according to the prior art, in which the curvature of the tread edge portions are exaggerated.

FIG. 3 shows a tire of a rib-rug type tread pattern for another embodiment of the present invention, wherein each buffer plan 5 is provided with one buffer groove 20, and lug grooves 25 are extended axially from each buffer plan 5 to the ground contacting area across the buffer groove, and the sipes 24 extending axially inwardly from the buffer groove 20 are also provided between the circumferentially adjacent two lug grooves. Even in such a case where the buffer groove is crossed by another groove such as the lug groove 25 of FIG. 3, the buffer groove is substantially continuous in the circumferential direction of the tire though such groove.

As described above, in the present invention, the tire is provided with the buffer planes extended radially inwardly one from each edge of the ground contacting area. Accordingly, even when the ground surface has various inclinations in the lateral direction with respect to the running direction, the tire can always contact with the ground at a certain portion between the edges of the ground contacting area because the unfixed non-contacting portions has been previously removed. As the result, the variation of the width and shape of the ground contacting ares is suppressed, and the occurences of the wandering phenomenon are lessened.

Furthermore, each buffer plane is provided with at least one buffer groove, whereby the rigidity of the edge portions of the tread is lowered. Accordingly, the edge portion damps the force acting thereon from the road surface inclinations, which further lessens the occurrence of the wandering phenomenon.

Still further, if the sipes are formed in the edge portions, the vending rigidity of these portions would become low, and the fitness to the road is improved, which would alleviate not only the wandering phenomenon but also the tread edge wear.

I claim:

1. A heavy duty radial tire having
   a tread surface defining a ground contacting area between the axially outer edges thereof and provided with at least one longitudinal groove extending in the circumferential direction of the tire, and
   a buffer plane portion extending radially inwardly and axially outwardly from each of said axial outer edges of said tread surfaces so as to be formed substantially in part of a right cone having an axis placed on the tire axis, defined as a rotational center of the tire,
   said buffer plane portion having an outer surface extending along a plane inclined at an angle in the range of 25 to 70 degrees with respect to a tire equatorial plane, with a total length (b) along said outer surface of the buffer plane portion being at least 0.05 to less than 0.15 times a total axial length (a) between said axial outer edges of the tread surface, and
   said buffer plane portion being provided with at least one buffer groove extending substantially continuously in the circumferential direction of the tire with a depth (c) being in the range of 0.25 to 0.8 times groove depth (d) of said longitudinal groove.

2. The heavy duty radial tire as set forth in claim 1, wherein the angle between the center line of each buffer groove to an equatorial plane is in the range of −15 to 45 degrees.

3. A heavy duty radial tire as set forth in claim 1 or 2, in which each buffer plane portion is provided thereon with sipes extended axially inwardly from the buffer groove beyond the edge of the tread surface.

* * * * *